(12) United States Patent
Jayaraman et al.

(10) Patent No.: US 11,647,077 B2
(45) Date of Patent: May 9, 2023

(54) VIN ESN SIGNED COMMANDS AND VEHICLE LEVEL LOCAL WEB OF TRUST

(71) Applicant: FORD GLOBAL TECHNOLOGIES, LLC, Dearborn, MI (US)

(72) Inventors: Vijayababu Jayaraman, Novi, MI (US); Brunilda Bleta Caushi, Northville, MI (US); Mohamad Nasser, Dearborn Heights, MI (US); Karl Clark, Belleville, MI (US); Jason Miller, Woodhaven, MI (US); Ali Suleiman, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 446 days.

(21) Appl. No.: 15/809,157

(22) Filed: Nov. 10, 2017

(65) Prior Publication Data

US 2019/0149610 A1    May 16, 2019

(51) Int. Cl.
| | | |
|---|---|---|
| *H04L 9/40* | (2022.01) | |
| *H04L 67/125* | (2022.01) | |
| *B60R 25/24* | (2013.01) | |
| *H04W 12/03* | (2021.01) | |

(52) U.S. Cl.
CPC ............ *H04L 67/125* (2013.01); *B60R 25/24* (2013.01); *H04L 63/06* (2013.01); *H04W 12/03* (2021.01); *B60W 2556/55* (2020.02); *H04L 2209/84* (2013.01)

(58) Field of Classification Search
CPC ... H04L 67/125; H04L 63/06; H04L 2209/84; H04L 9/3226; H04W 12/001; H04W 12/03
See application file for complete search history.

(56) References Cited

U.S. PATENT DOCUMENTS

| | | | |
|---|---|---|---|
| 2011/0145925 A1* | 6/2011 | Peirce | G06F 21/572 |
| | | | 726/26 |
| 2013/0212659 A1* | 8/2013 | Maher | H04W 4/44 |
| | | | 726/6 |
| 2014/0163771 A1* | 6/2014 | Demeniuk | B60K 35/00 |
| | | | 701/2 |
| 2015/0242198 A1 | 8/2015 | Tobolski et al. | |
| 2017/0026383 A1* | 1/2017 | Hayton | H04W 12/069 |
| 2017/0060559 A1 | 3/2017 | Ye et al. | |
| 2017/0134382 A1* | 5/2017 | Darnell | H04L 12/40 |

FOREIGN PATENT DOCUMENTS

WO    WO-2017010859 A1 *  1/2017  ............. H04H 20/91

\* cited by examiner

*Primary Examiner* — Fatoumata Traore
*Assistant Examiner* — Carlton Johnson
(74) *Attorney, Agent, or Firm* — Joseph M. Zane; Brooks Kushman P.C.

(57) ABSTRACT

A gateway of a vehicle is connected to a telematics control unit (TCU) and a plurality of electronic control units (ECUs). The gateway is programmed to receive a command from the TCU, the command specifying an electronic serial number (ESN) of a target ECU of the ECUs, and forward the command to the target ECU responsive to confirmation that the ESN of the target ECU is included in the web of trust.

17 Claims, 2 Drawing Sheets

VIN ESN SIGNED COMMANDS AND VEHICLE LEVEL LOCAL WEB OF TRUST

TECHNICAL FIELD

Aspects of the disclosure generally relate to a local web of trust for use in handling remote commands intended for target vehicle components.

BACKGROUND

Telematics services may include, as some non-limiting possibilities, navigation, turn-by-turn directions, vehicle health reports, local business search, accident reporting, and hands-free calling. In some instances, these services may be requested by an occupant of a vehicle. In other cases, these services may be requested by a remote server. For instance, a request to unlock a vehicle may be received by the vehicle from a remote server, and the vehicle may receive the request and command the vehicle doors to unlock.

SUMMARY

In one or more illustrative examples, a system includes a gateway of a vehicle, connected to a telematics control unit (TCU), and a plurality of electronic control units (ECUs), programmed to receive a command from the TCU, the command specifying an electronic serial number (ESN) of a target ECU of the ECUs, and forward the command to the target ECU responsive to confirmation that the ESN of the target ECU is included in the web of trust.

In one or more illustrative examples, a method includes confirming, by a gateway of a vehicle, that an ESN of a target ECU of a received command is included in a web of trust stored to the gateway; if so, forwarding the command to the target ECU; and if not, verifying that the target ECU is trusted according to a trust response to a trust request sent by the gateway to a plurality of subnets of the vehicle.

In one or more illustrative examples, a non-transitory computer-readable medium includes instructions that, when executed by a processor of a gateway of a vehicle, cause the gateway to confirm that an ESN of a target ECU of a received command is included in a web of trust stored to the gateway; if so, forward the command to the target ECU; and if not, verifying that the target ECU is trusted according to a trust response to a trust request sent by the gateway to a plurality of subnets of the vehicle.

DETAILED DESCRIPTION

Figure 1:
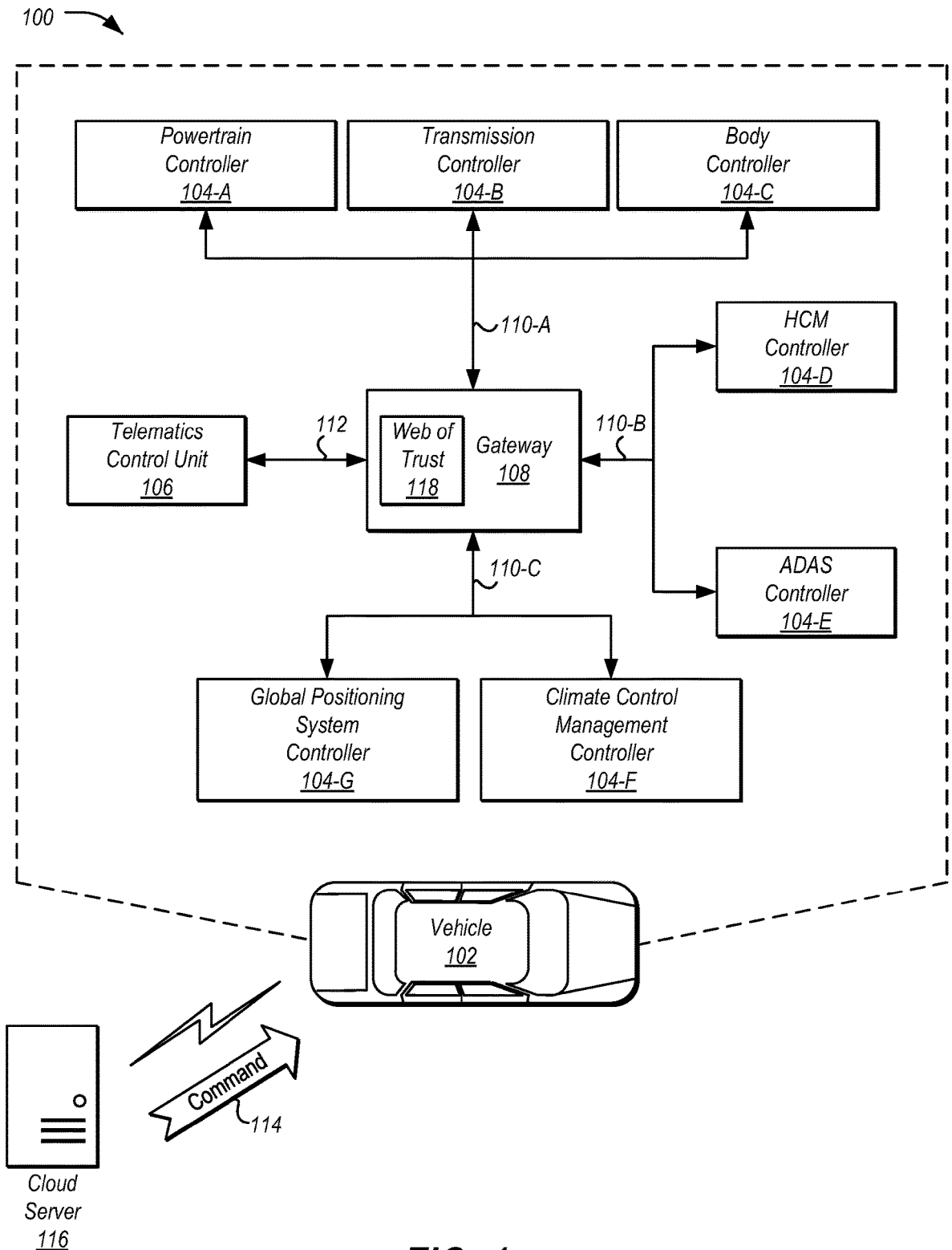
FIG. 1 illustrates an example system topology for processing of commands communicated to various ECUs of a vehicle via a gateway.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

With the expansion of connected applications in the vehicle context, there has been an increase in remote operation of vehicle electronic control units (ECUs). These remote operations typically operate by sending secure commands to vehicle ECUs from a cloud server. Some of the vehicle ECUs having greater computing capabilities to store symmetric keys for use in the encrypting and decrypting of secured commands. Examples of such ECUs may include a telematics control unit (TCU) or a gateway. However, other ECUs of the vehicle lack symmetric keys due to cost pressures or limited ECU resources.

Using current security approaches, a command signed with an ESN (electronic serial number) may be sent to a target ECU. However, no validation is performed to ensure correspondence of the VIN (Vehicle Identification Number) and ESN (Electronic Serial Number) of the target ECU. Moreover, current approaches do not validate any association of a gateway ESN and target ECU ESN by the vehicle.

In an improved approach, VIN and ESN signed commands may be sent to a gateway as symmetric-key encrypted commands. The gateway receives the encrypted commands (e.g., from the TCU) and decrypts the commands using symmetric secret keys. The received command may be intended to be provided to a target ECU. But, before the gateway sends the command to the target ECU, the gateway may verify a local web of trust to confirm whether the target ECU is trusted. For instance, the gateway TCU may query whether an electronic serial number (ESN) of the target ECU and a vehicle identification number (VIN) of the vehicle in the signed command payload are present in the local web of trust. If the local web of trust does not contain an association of the VIN and ESN (vehicle to target ECU) or ESN to ESN association (gateway to target ECUs), the gateway performs a trust test by sending "Who are you? and Where are you?" questions to the Target ECU. Responsive to the trust test, the target ECU may respond with a VIN and ESN via an encrypted CAN FD/Secured Ethernet Pub/Sub mechanism. The gateway may receive this VIN and ESN, and may verify the VIN from its secured location and associated trusted known source. If the validation is successful, the gateway/TCU may add the target ECU to a local web of trust, and may forward the received command to the target ECU. Accordingly, using the local web of trust, the gateway may operate as a firewall for commands to be forwarded to the target ECUs. Further aspects of the disclosure are discussed in detail below.

FIG. 1 illustrates an example system topology 100 for processing of commands 114 communicated to various ECUs 104 of a vehicle 102 via a gateway 108. Each ECU 104 is connected to one of a plurality of subnets 110. A telematics control unit (TCU) 106 is included to facilitate communication between various components of the vehicle 102 and those of other vehicles 102 and/or mobile devices via external and in-vehicle networks (not shown). The TCU 106 may be connected to a backbone 112 portion of the system topology 100 and may communicate with the ECUs 104 via the gateway 108. While an example system topology 100 is shown in FIG. 1, the example components as illustrated are not intended to be limiting. Indeed, the system topology 100 may have more or fewer components, and additional or alternative components and/or implementations may be used. As an example, the ECUs 104 and the TCU 106 may each be connected to one or more same or different types of nodes as the subnets 110 and the backbone 112.

The vehicle 102 may be, for example, various types of automobile, crossover utility vehicle (CUV), sport utility vehicle (SUV), truck, recreational vehicle (RV), boat, plane or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As the type and configuration of vehicle 102 may vary, the operating characteristics of the vehicle may correspondingly vary. As some other possibilities, the vehicle 102 may have different characteristics with respect to passenger capacity, towing ability and capacity, and storage volume.

The ECUs 104 may include various hardware and software components and may be configured to monitor and manage various vehicle functions under the power of the vehicle 102 battery and/or drivetrain. The ECUs 104 may, accordingly, include one or more processors (e.g., microprocessors) (not shown) configured to execute firmware or software programs stored on one or more storage devices (not shown) of the ECUs 104. While the ECUs 104 are illustrated as separate components, the vehicle ECUs 104 may share physical hardware, firmware, and/or software, such that the functionality from multiple ECUs 104 may be integrated into a single ECU 104, and the functionality of various such ECUs 104 may be distributed across a plurality of ECUs 104.

The ECUs 104 may include a powertrain controller 104-A configured to manage operating components related to one or more vehicle sources of power, such as engine, battery, and so on, a transmission controller 104-B configured to manage power transfer between vehicle powertrain and wheels, a body controller 104-C configured to manage various power control functions, such as exterior lighting, interior lighting, keyless entry, remote start, and point of access status verification, a headlamp control module (HCM) 104-D configured to control light on/off settings, mobile devices, or other local vehicle 102 devices, advanced driver assistance systems (ADAS) 104-E such as adaptive cruise control or automated braking, a climate control management controller 104-F configured to monitor and manage heating and cooling system components (e.g., compressor clutch, blower fan, temperature sensors, etc.), and a global positioning system (GPS) controller 104-G configured to provide vehicle location information. It should be noted that these are merely examples and vehicles 102 having more, fewer, or different ECUs 104 may be used.

The TCU 106 may include one or more processors (not shown) (e.g., microprocessors) configured to execute firmware or software programs stored on one or more respective storage devices of the TCU 106. The TCU 106 may include a modem or other network hardware to facilitate communication between the vehicle 102 and one or more networks external to the vehicle 102. These external networks may include the Internet, a cable television distribution network, a satellite link network, a local area network, a wide-area network, and a telephone network, as some non-limiting examples.

The vehicle 102 may further include a gateway 108. In an example, the gateway 108 may implement functionality of a smart data link connector (SDLC). The gateway 108 may be configured to facilitate data exchange between vehicle ECUs 104. The gateway 108 may be further configured to facilitate data exchange between the vehicle ECUs 104 and the TCU 106 located on the backbone 112. In an example, the vehicle ECUs 104 and the TCU 106 may communicate with the gateway 108 using CAN communication protocol, such as, but not limited to, a high-speed (HS) CAN, a mid-speed (MS) CAN, or a low-speed (LS) CAN. Different subnets 110 may utilize different CAN protocol speeds. In an example, one or more of the subnets may implement HS-CAN, while one or more other subnets 110 may implement MS-CAN. In yet other examples, the gateway 108 may be configured to facilitate communication using one or more of an Ethernet network, a media oriented system transfer (MOST) network, a FlexRay network, or a local interconnect network (LIN).

One or more of the subnets 110 may define a main subnet, which may be referred to as a backbone 112. The backbone 112 may include a portion of the system topology 100 configured to serve as a joining point of communication for the other subnets 110 of the vehicle 102. Accordingly, the backbone 112 may be configured to manage and route data traffic in a greater volume than that provided via the other subnets 110. Using the message processing features of the gateway 108, the gateway 108 may be configured to transmit message frames between the TCU 106 located on the backbone 112 and the one or more of the vehicle ECUs 104 located on the other subnets 110.

The gateway 108 may be configured to identify on which subnet 110 each of the ECUs 104 and TCU 106 is located. This may be accomplished according to a corresponding physical network address of the ECUs 104 and TCU 106. In an example, in response to receiving a request to route a message to a given ECU 104 or the TCU 106, the gateway 108 may query a storage to identify a network address corresponding to the ECU 104 or the TCU 106. For instance, the gateway 108 may include a storage configured to store the network addresses, as well as a routing schema defining which messages are routed to which subnets 110 and/or backbone 112. This routing may be determined by the gateway 108 based on predefined parameters included in the message, such as a type of message and/or identifiers of the ECUs 104 or the TCU 106 that designate the source and/or target of the message.

In some examples, a subset of the ECUs 104 may receive keys distributed to the ECUs 104 at build time. This may be referred to as being performed at the vehicle operation (VO) stage. The key distribution may establish a trust relationship among different groups of ECUs 104 on the same vehicle 102, which may enable authenticated communication among the ECUs 104. To minimize effects on the VO process at prerolls and at dynamic and static end-of-line (EOL) stations, the process is initiated at prerolls with a simple diagnostic request and works in the background while the key is in the ON position.

A command 114 may be sent from a cloud server 116 to the vehicle 102. The command 114 may be a request for an ECU 104 of the vehicle 102 to perform an operation, such as unlock vehicles doors. The command 114 may be received by the TCU 106 and provided to the gateway 108 for transmission to the target ECU 104. For those ECUs 104 that maintain a key, validation of the command 114 may be performed by the target ECU 104.

However, some of the ECUs 104 may not have the capability to store keys or may lack the processing power necessary to decrypt messages using such a key. In such examples, validation of messages to the ECU 104 may be performed by additional processing at the gateway 108. To facilitate this processing, the gateway 108 may host a web of trust 118. The web of trust 118 may maintain status information indicative of which ECUs 104 have been validated by the gateway 108 as being trusted. By using the web of trust 118, the gateway 108 can automatically filter commands 114 from a server 116 intended to reach a target ECU 104 by ensuring that the target ECU 104 is trusted.

Figure 2:
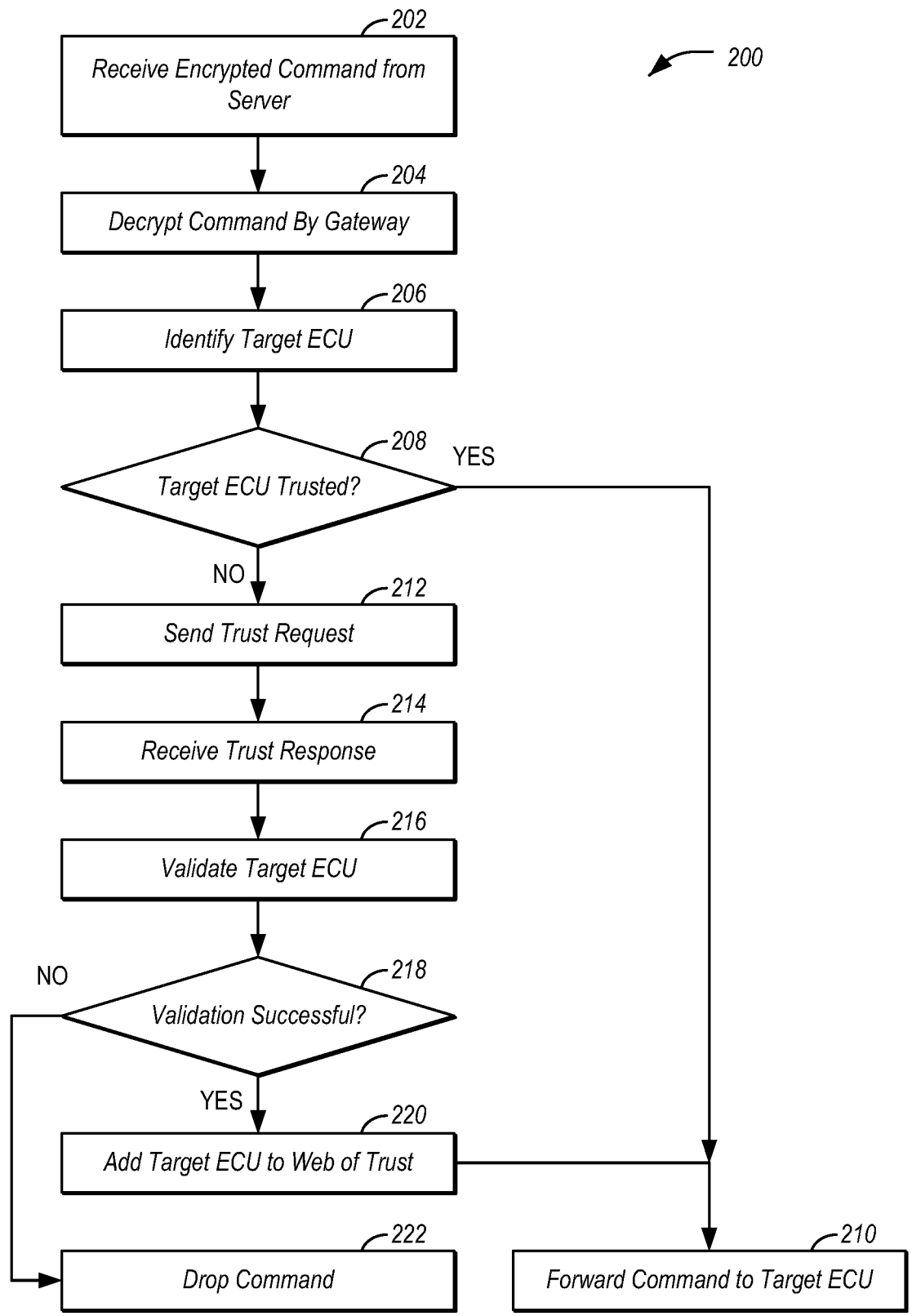
FIG. 2 illustrates an example process for processing of commands intended for target ECUs.

FIG. 2 illustrates an example process 200 for processing of commands 114 intended for target ECUs 104. In an example, the process 200 may be performed by the system 100 as described above.

At 202, the vehicle 102 receives an encrypted command 114 from a server 116. In an example, the command 114 may be a request for the body controller 104-C to unlock the vehicle 102 doors. In another example, the command 114 may be a request for the climate control management controller 104-F to set a preconditioning temperature for the cabin of the vehicle 102. In yet another example, the command 114 may be a request to the transmission controller 104-B to update a transmission program of the vehicle 102. The command 114 may be received by the TCU 106, and may be passed by the TCU 106 to the gateway 108 via the backbone 112.

At 204, the vehicle 102 decrypts the command 114. In an example, the gateway 108 may utilize a key assigned to the vehicle 102 to decrypt the command 114. In some cases, the key may be a symmetric key that is the same as a key used by the server 116 to encrypt the command 114. In other cases, the key may be a decryption key assigned to the vehicle 102, and used to decrypt commands 114 encrypted by the server 116 using an encryption key corresponding to the decryption key.

At 206, the vehicle 102 identifies a target ECU 104 for the command 114. In an example, a field of the command 114 may indicate the ESN of the ECU 104 (e.g., body controller, etc.) of the vehicle 102 intended to receive the command 114, and the gateway 108 may utilize that field to identify the target ECU 104. In another example, the command 114 may indicate an intended action, and the gateway 108 may utilize a map of actions to ECUs 104 to identify the target ECU 104.

At 208, the vehicle 102 determines whether the target ECU 104 is trusted. In an example, the vehicle 102 may access the web of trust 118 to determine whether the ESN of the target ECU 104 has previously been indicated as trusted. In an example, the web of trust 118 may store associations of ESNs of ECUs 104 and VIN of the vehicle 102, such that if an ESN appears within the web of trust 118, then the ESN has been identified as trusted for the VIN of the vehicle 102. In another example, the web of trust 118 may store associations of ESNs of the ECUs 104 of the vehicle 102 to the ESN of the gateway 108 of the vehicle 102, such that if an ESN appears within the web of trust 118, then the ESN has been identified as trusted for the gateway 108. If the ESN of the ECU 104 appears in the web of trust 118 as being trusted, control passes to operation 210. Otherwise, control passes to operation 212.

At 210, the vehicle 102 forwards the command to the target ECU 104. In an example, the gateway 108 may provide the command 114 to the target ECU 104 via the subnet 110 to which the target ECU 104 is connected. After operation 210, the process 200 ends.

At 212, the vehicle 102 sends a trust request to the target ECU 104. In an example, the trust test may include a request to the subnets 110 requesting that the ECU 104 reply to indicate on which subnet 110 the ECU 104 is located. In another example, the trust test may include a request to the subnets 110 for other specific information of the ECU 104, such as versioning information.

At 214, the vehicle 102 receives a trust response from the target ECU 104. In an example, the ECU 104 may respond to the trust request over the subnet 110 to which the ECU 104 is connected. The trust response may include, for example, the ESN of the ECU 104, and the VIN of the vehicle 102. In an example, the trust response may be provided in an encrypted form. The encryption may include, for example, a precomputed version of the ESN and VIN encrypted using a symmetric key known to the gateway 108.

At 216, the vehicle 102 validates the trust response from the target ECU 104. As some examples, the gateway 108 may confirm that a trust response was received, that the request was properly decrypted, and/or that the VIN matches that of the vehicle 102. At 218, the vehicle 102 determines whether the validation was successful. If so, control passes to operation 220. If not, control passes to operation 220.

At 220, the vehicle 102 adds the target ECU 104 to the web of trust 118. For instance, the gateway 108 may add the ESN of the target ECU 104 to the web of trust 118 to indicate that future commands 114 from the target ECU 104 may be forwarded on. The web of trust 118 may also specify on which of the subnets 110 the target ECU 104 is located. After operation 220, control passes to operation 210 to forward the command 114 to the target ECU 104.

At 222, the vehicle 102 drops the command 114. For instance, as the gateway 108 is unable to validate the target ECU 104, the command 114 is not sent along. After operation 222, the process 200 ends.

Computing devices described herein, such as the ECUs 104, TCU 106, gateway 108, and server 116, generally include computer-executable instructions where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, C#, Visual Basic, JavaScript, Python, JavaScript, Perl, PL/SQL, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined not with reference to the above description, but with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
   a gateway of a vehicle, connected to a telematics control unit (TCU) and a plurality of electronic control units (ECUs), the gateway configured to store symmetric keys for use in encrypting and decrypting of secured commands, the ECUs of the vehicle lacking symmetric keys, programmed to
      receive a command from the TCU, the command specifying an electronic serial number (ESN) of a target ECU of the ECUs;
      responsive to confirmation that the ESN of the target ECU is not included in a web of trust,
         send a trust request to a plurality of subnets of the vehicle,
         receive a trust response from the target ECU via one of the subnets, the trust response including a precomputed version of the ESN encrypted using a symmetric key known to the gateway, the ECU lacking capability to store symmetric keys, and
         verify that the target ECU is trusted at least by decrypting the trust response using the symmetric key and adding the ESN to the web of trust;
   and
      forward the command to the target ECU responsive to confirmation that the ESN of the target ECU is included in the web of trust stored to the gateway.

2. The system of claim 1, wherein the gateway is further programmed to:
   decrypt the command using the symmetric key; and
   identify the ESN of the target ECU from the command as decrypted.

3. The system of claim 1, wherein the trust response further includes a precomputed version of a vehicle identification number (VIN) of the vehicle encrypted using the symmetric key, and the gateway is further programmed to verify that the target ECU is trusted by validating that the VIN is included in the trust response.

4. The system of claim 1, wherein the gateway is further programmed to verify that the target ECU is trusted by validating that the trust response is successfully decrypted by the gateway.

5. The system of claim 1, wherein the gateway is further programmed to add the ESN of the target ECU to the web of trust responsive to successful verification that the target ECU is trusted.

6. The system of claim 5, wherein the gateway is further programmed to indicate, in the web of trust, on which one of the subnets the target ECU is located as the one of the subnets on which the trust response is received.

7. A method comprising:
   confirming, by a gateway of a vehicle, whether an ESN of a target ECU of a received command is included in a web of trust stored to the gateway, the gateway storing symmetric keys for use in encrypting and decrypting of secured commands, the ECUs of the vehicle lacking symmetric keys;
   responsive to the ESN being included in the web of trust, forwarding the command to the target ECU; and
   responsive to the ESN not being included in the web of trust,
      sending a trust request to a plurality of subnets of the vehicle,
      receiving a trust response from the target ECU via one of the subnets, the trust response including a precomputed version of the ESN and a vehicle identification number (VIN) of the vehicle encrypted using a symmetric key known to the gateway, the target ECU lacking capability to store symmetric keys, and
      verifying that the target ECU is trusted according to the trust response responsive to properly decrypting the trust response using the symmetric key by adding the ESN to the web of trust.

8. The method of claim 7, further comprising verifying that the target ECU is trusted by validating that the vehicle identification number (VIN) of the vehicle is included in the trust response.

9. The method of claim 7, further comprising verifying that the target ECU is trusted by validating that the trust response is successfully decrypted by the gateway.

10. The method of claim 7, further comprising adding the ESN of the target ECU to the web of trust responsive to successful verification that the target ECU is trusted.

11. The method of claim 7, further comprising indicating, in the web of trust, on which one of the subnets the target ECU is located as the one of the subnets on which the trust response is received.

12. The method of claim 7, wherein the command is a request to unlock vehicle doors, and the target ECU is a body controller of the vehicle.

13. A non-transitory computer-readable medium including instructions that, when executed by a processor of a gateway of a vehicle including a plurality of other ECUs in communication with the gateway, cause the gateway to:

confirm whether an ESN of a target ECU of a received command is included in a web of trust stored to the gateway, the gateway configured to store symmetric keys for use in encrypting and decrypting of secured commands, the other ECUs of the vehicle lacking symmetric keys;

responsive to the ESN being included in the web of trust, forward the command to the target ECU; and responsive to the ESN not being included in the web of trust, send a trust request to a plurality of subnets of the vehicle, receive a trust response from the target ECU via one of the subnets, the trust response including a precomputed version of the ESN encrypted using a symmetric key known to the gateway, the target ECU lacking capability to store symmetric keys, and verify that the target ECU is trusted according to the trust response responsive to properly decrypting the trust response using the symmetric key by adding the ESN to the web of trust.

14. The medium of claim 13, further comprising instructions that, when executed by the processor of the gateway, cause the gateway to verify that the target ECU is trusted by validating that a vehicle identification number (VIN) of the vehicle is included in the trust response.

15. The medium of claim 13, further comprising instructions that, when executed by the processor of the gateway, cause the gateway to verify that the target ECU is trusted by validating that the trust response is successfully decrypted by the gateway.

16. The medium of claim 13, further comprising instructions that, when executed by the processor of the gateway, cause the gateway to add the ESN of the target ECU to the web of trust responsive to successful verification that the target ECU is trusted.

17. The medium of claim 13, further comprising instructions that, when executed by the processor of the gateway, cause the gateway to indicate, in the web of trust, on which one of the subnets the target ECU is located as the one of the subnets on which the trust response is received.

\* \* \* \* \*